P. BARBER.
Harvester.
No. 230,854.
Patented Aug. 10, 1880.
5 Sheets—Sheet 1.
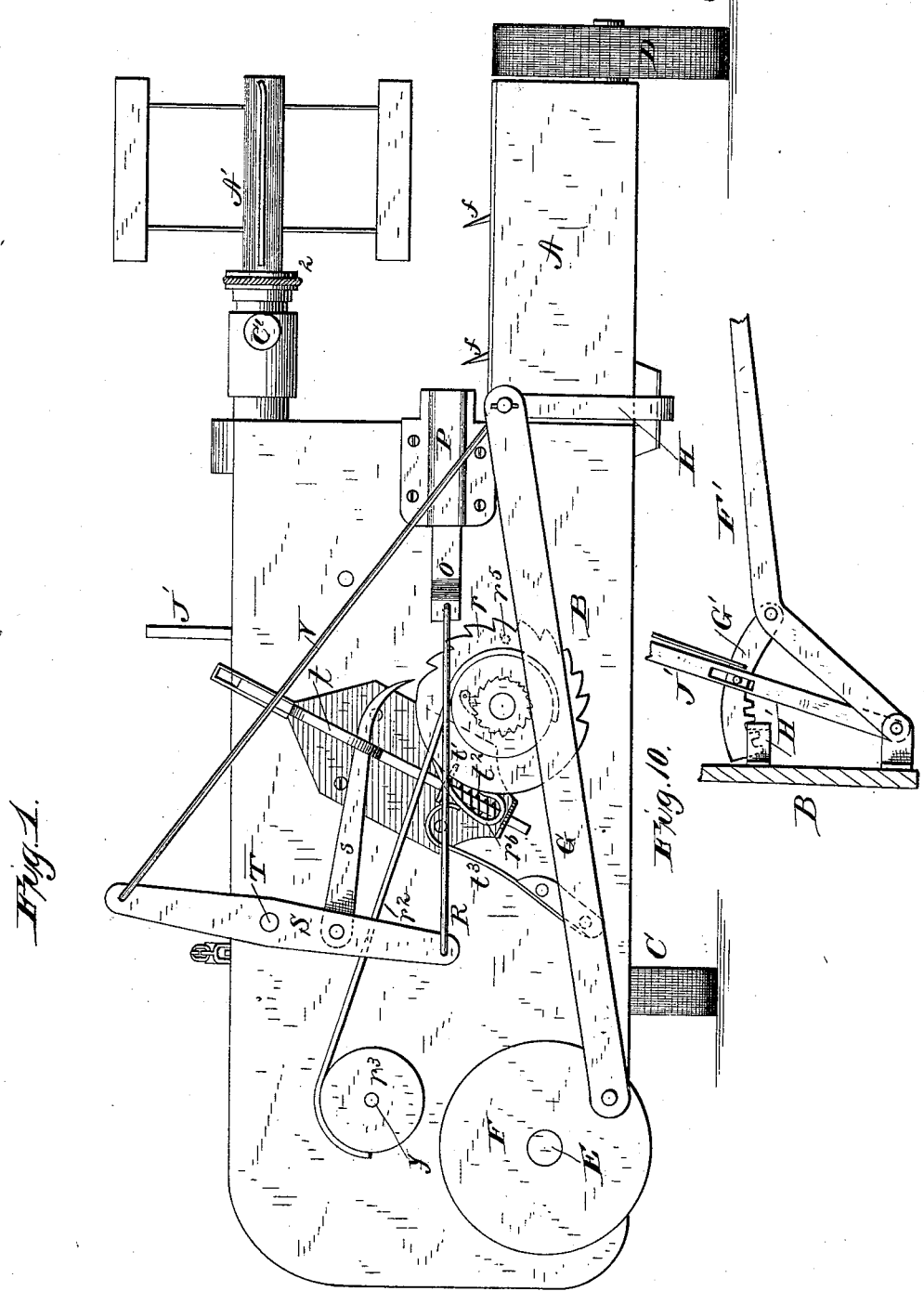

P. BARBER.
Harvester.
No. 230,854.
5 Sheets—Sheet 2.
Patented Aug. 10, 1880.
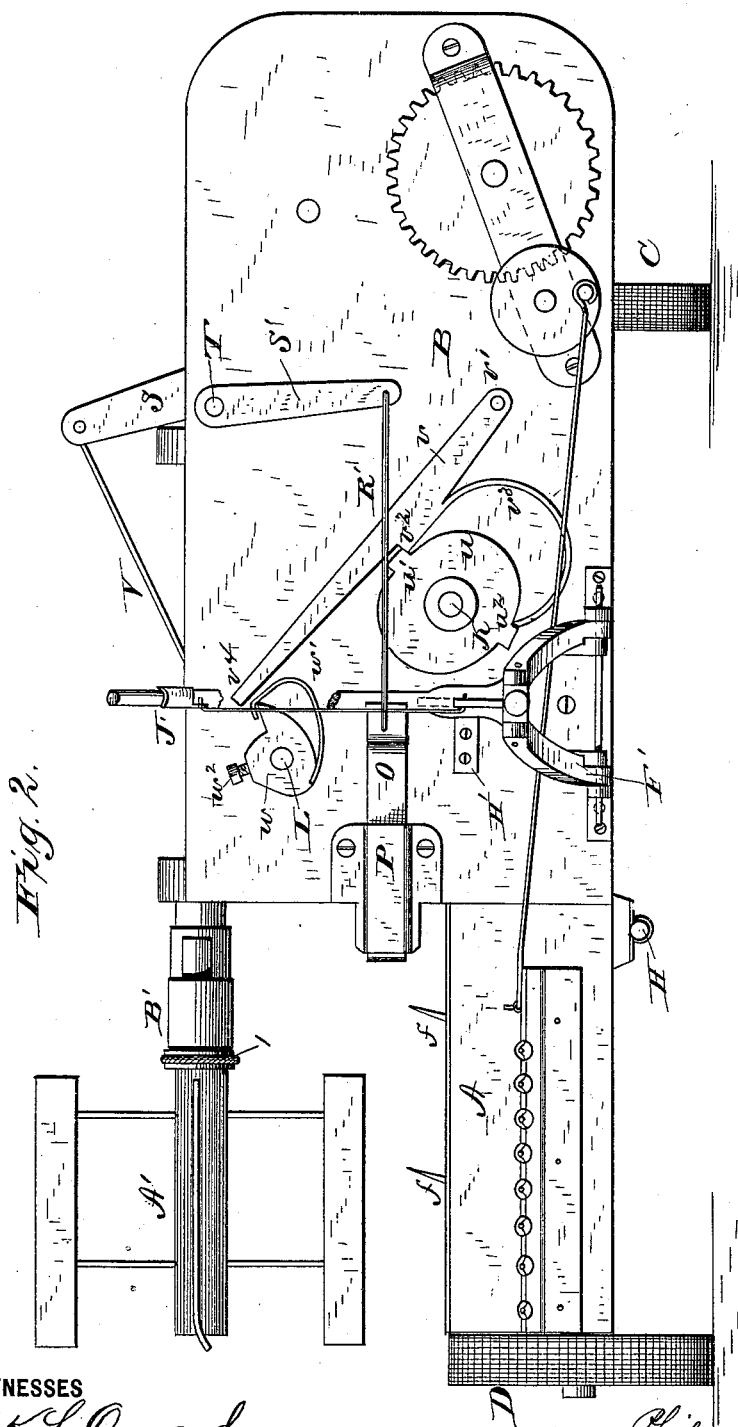
WITNESSES
Franck L. Ouraud
Harry Finckel
INVENTOR
Philemon Barber
by Wm H Finckel
ATTORNEY
N. PETERS, PHOTO-LITHOGRAPHER, WASHINGTON, D. C.

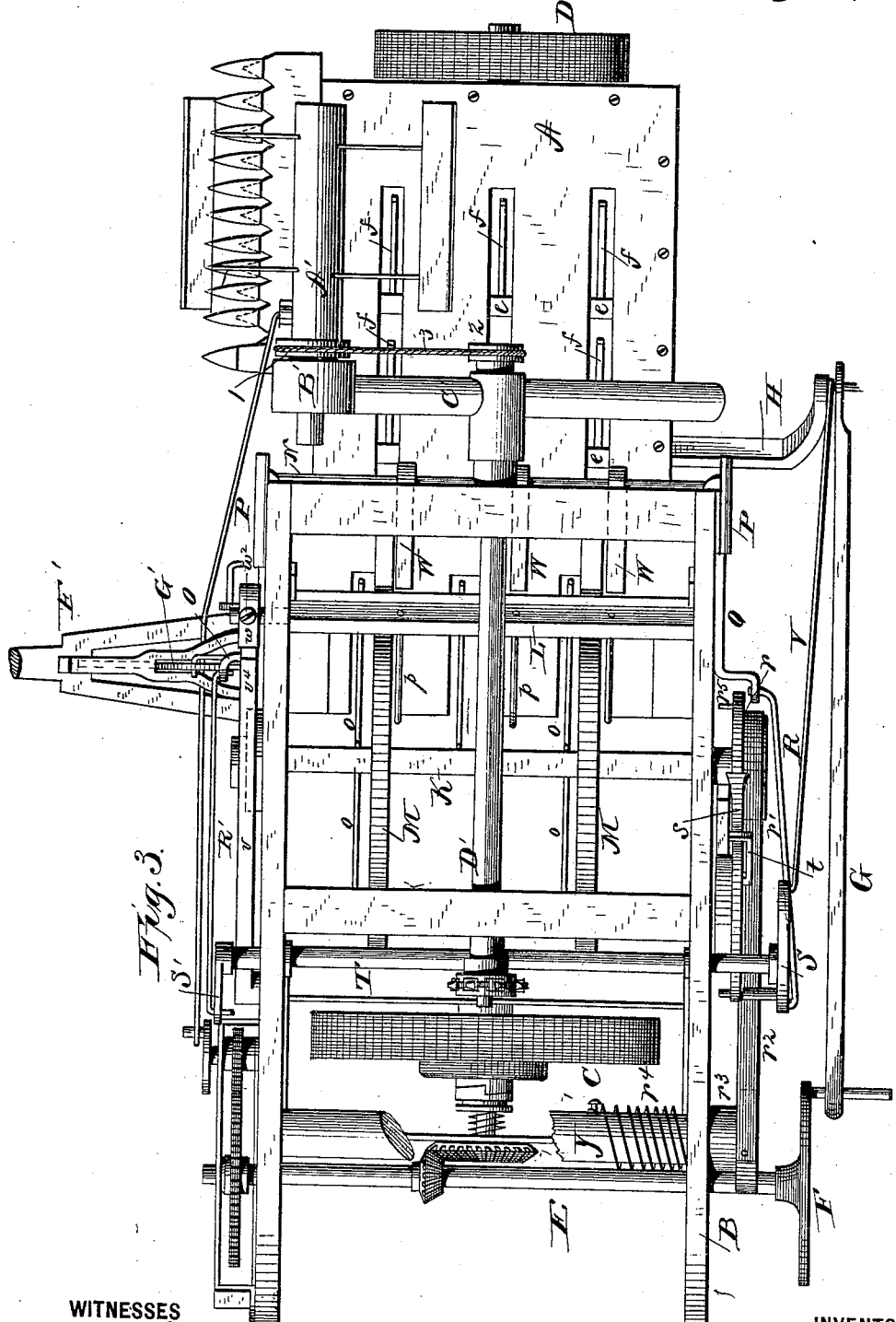

P. BARBER.
Harvester.
No. 230,854.
5 Sheets—Sheet 4.
Patented Aug. 10, 1880.
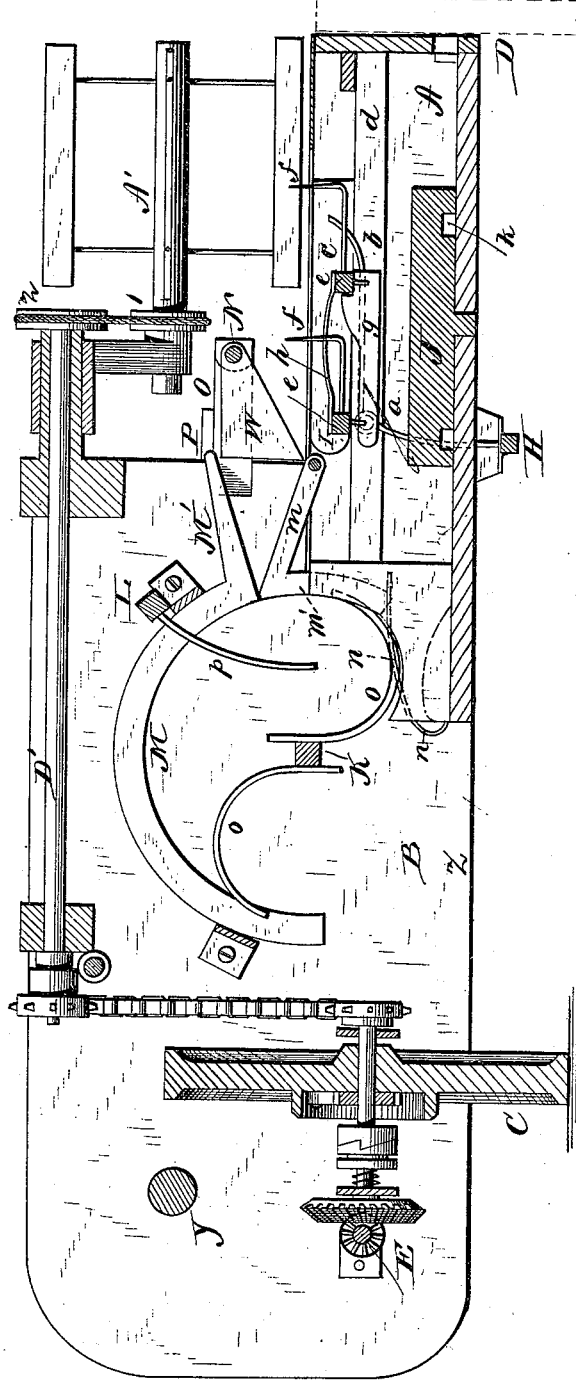
WITNESSES
Franck L. Ouvaud
Harry Finckel
INVENTOR
Philemon Barber
by Wm H Finckel
ATTORNEY P. BARBER.
Harvester.
No. 230,854.      Patented Aug. 10, 1880.
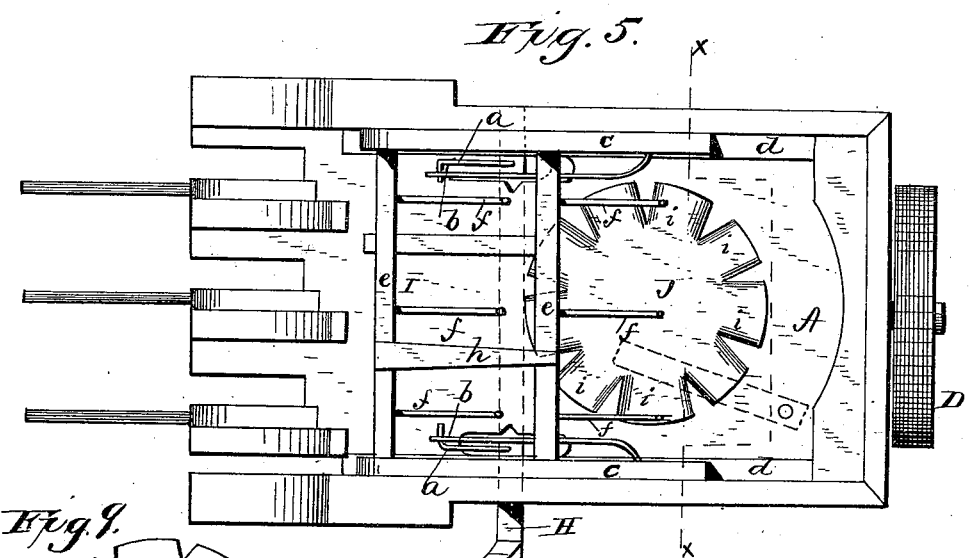
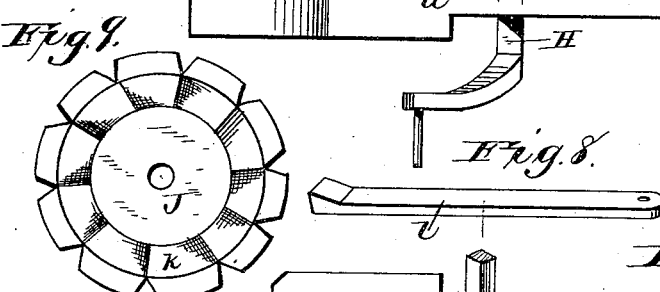
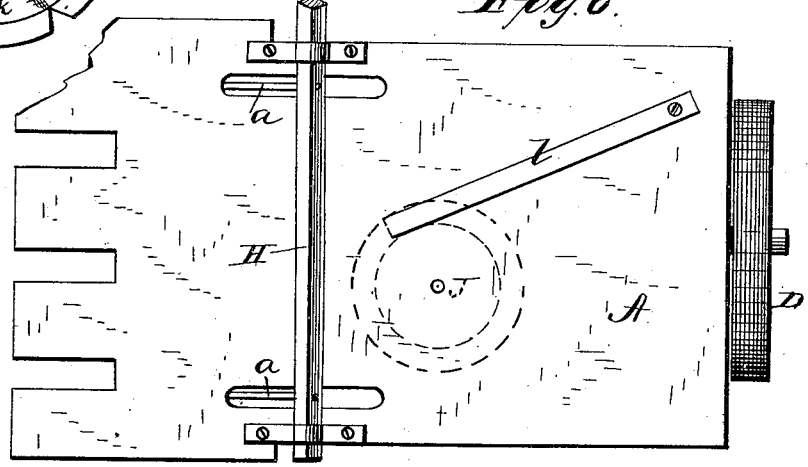
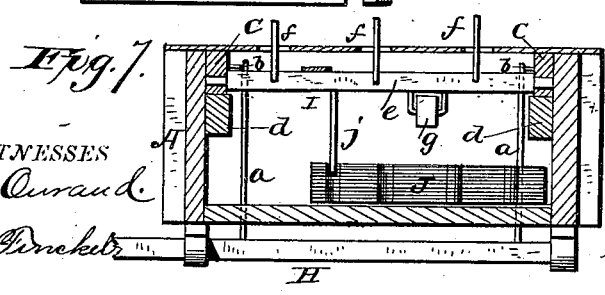
WITNESSES
INVENTOR
Philemon Barber
by Wm. H. Fincke
Attorney.

UNITED STATES PATENT OFFICE.

PHILEMON BARBER, OF AKRON, OHIO.

HARVESTER.

SPECIFICATION forming part of Letters Patent No. 230,854, dated August 10, 1880.

Application filed December 20, 1879.

*To all whom it may concern:*

Be it known that I, PHILEMON BARBER, of Akron, in the county of Summit, in the State of Ohio, have invented certain new and useful Improvements in Harvesters, of which the following is a full, clear, and exact description, reference being had to the accompanying drawings, forming part hereof.

This invention relates to that class of harvesting-machines known as "droppers," and is herein designated as a "bundler," for the reason that it gathers and compresses the grain, as it is cut, into bundles, and drops them as they are formed.

The invention consists in the hereinafter-described improved form of combination of a rake or carrier operating to straighten the grain as it falls thereon, and a bundling mechanism receiving the grain from the rake or carrier, compressing it into a bundle, and automatically dropping such bundle from the machine in a convenient, compact, and suitable shape for the binder.

In the drawings before referred to, Figure 1 is a rear elevation of a harvester embodying my improvements. Fig. 2 is a front elevation thereof. Fig. 3 is a top-plan view of the same. Fig. 4 is a central longitudinal section. Fig. 5 is a top-plan view of the rake or carrier mechanism; Fig. 6, a bottom view, and Fig. 7 a partly sectional elevation, of the same, the section being on line $x\ x$, Fig. 5. Fig. 8 is a perspective view of the spring-dog for the rake-cam shown in bottom view, Fig. 9. Fig. 10 is a side elevation of the tongue or pole and means for raising and lowering the cutter-bar of a harvester.

The cutter-bar and its driving mechanism may be of any approved pattern. In the illustration in the accompanying drawings said cutter-bar is attached to the front of the platform A. This platform may be a part of or connected to a frame, B, the two parts A and B carrying the operative parts of the machine and being mounted upon a driving-wheel, C, and a grain-wheel, D. These parts will, of course, be modified to conform to the cutting mechanism employed.

E is the driving-shaft in frame B, receiving its motion through beveled gearing and clutch-connection with the driving-wheel, as shown in Figs. 3 and 4. F is a disk or crank wheel on shaft E, from which extends a pitman, G, connecting it with a crank rock-shaft, H. This crank rock-shaft may be borne by the platform A, and has arms $a$, which, by means of links $b$, are connected with the rake or carrier I, and impart to it a reciprocating motion within the platform A. This rake or carrier is composed of bars $c$, arranged to slide upon rails $d$, the bars $c$ being connected transversely by bars $e$, which are arranged to rock in the bars $c$, and the rocking bars $e$ being connected by a shouldered locking-bar, $g$. Any number of the rocking bars may be employed consistent with the length of the platform, and these bars are provided with L-shaped teeth, (see Fig. 4,) which are arranged to extend up through slots in the face of the platform.

The bars $e$ will hereinafter be designated "rake-heads." These rake-heads are provided with springs $h$, to hold them and their teeth in a horizontal position. Beneath the rake-heads and within the platform A is arranged a rake-cam, J, against which a pin, $j$, on one of said rake-heads works to trip or rock said rake-heads and depress the rake-teeth below the level of the platform on the return stroke of the rake, so that they will pass beneath the grain fallen upon the platform, the pin clearing the cam at the end of the return stroke, and thereby permitting the teeth, through the action of their springs $h$, to rise through the slots in the platform, assume a horizontal position, and thus be ready to gather and carry forward the grain.

In the herein-shown rake-cam I employ a disk placed upon a pivot and capable of rotation thereon. This disk has a number of radial cams or inclined surfaces, $i$, which may vary in size, so as to trip the rake-teeth harmoniously with the stroke of the rake. The under surface of this disk is provided with a rack, $k$, the teeth of which are engaged by a spring-dog, $l$, (see Figs. 8 and 9,) to prevent reverse or back motion of the cam under the action of the pin $j$.

At the inner end of the platform A are hinged a number of arms, $m$, normally elevated by springs $n$. These springs may be flat springs in contact with the ends $m'$ of arms $m$, as shown, or the arms may be arranged upon a shaft having a coiled spring, or each arm may have a coiled spring to support it. The ends $m'$ of these arms extend downwardly in a curve, as shown in Fig. 4.

K is an intermittingly-rotated shaft having two sets of reversely-curved fingers, $o$, arranged opposite one another. It is obvious that one set of such fingers may be used, or more than two, the necessary changes being made in their operating mechanism to conform to the number employed.

L is a tripping-bar having pendent fingers $p$, and arranged above the inner end of the platform A.

M designates a number of arched bars arranged above the shaft K, and having a curve of a radius substantially equal to that of the curve described by the fingers $o$, so that such fingers in their revolution shall come within said bars. These bars spring from a point beyond the shaft K, a little below said shaft, and extend toward the platform A, below the bar L, their rear ends being in line with the curved ends $m'$ of the arms $m$.

These several last-described devices constitute my bundling mechanism, the arms $m$ $m'$ forming the guards for its inlet or mouth. The bars M terminate in fingers M', forming an acute angle with the arms $m$, and, with said arms, constituting the inlet to the bundling mechanism.

N is a shaft supported in slides O, fitted in bearing-ways P, affixed to the rear end of the frame B, over the platform A. These slides are reciprocated horizontally by means of rods R R', attached to cranks S S' upon opposite ends of a shaft, T, in the frame B. This shaft T receives a rocking motion from the shaft H, to which it is connected by a rod, V. On the shaft N are loosely arranged gravitating follower-blocks W. (Here shown of an angular form.)

The shaft N is reciprocated in a direction opposite to that of the rake, so that when the rake moves toward the bundling mechanism, and carries its load of grain thereto, the followers will ride over such load backward or away from the bundler, and when the rake returns from the bundler the followers will begin their forward stroke, carrying the gathered grain forward, and forcing it over the yielding arms $m$ below the fingers M', onto the fingers $o$, and beneath the fingers $p$, which latter fingers serve to compress the grain in order to pack it into shapely bundles for the binders following the harvester. The arms $m$ $m'$, being normally elevated, prevent the grain from pressing out of the bundler.

The bundler mechanism is operated automatically as follows: On the shaft K, at one end, (see Fig. 1,) is a ratchet, $r$, held against back motion by an internal reverse-ratchet, as shown in dotted lines, Fig. 1. This ratchet $r$ has a drum, $r'$, from which extends a band or strap, $r^2$, to a drum, $r^3$, on a shaft or stud, $y$, having a spring, $r^4$, coiled about it. Said ratchet $r$ has also on its inner face a pin, $r^5$, and on its periphery a cam or incline, $r^6$.

$s$ is a pawl pivoted to and moved by the crank S, and caused to engage with the teeth of the ratchet $r$ by gravity or by means of a spring. This pawl is arranged in a slot in a slide, $t$, which is provided with a transverse pin, $t'$, extending through it on both sides, and a spring, $t^2$, which latter tends to elevate the slide, and so free the pawl from the ratchet. $t^3$ is a spring-hook engaging the pin $t'$ on one side to hold the slide down, so as to allow the pawl to engage with the ratchet. This engagement of the pawl with the ratchet is effected by the rocking of the crank S. As said ratchet is rotated it winds the strap $r^2$ about its drum $r'$, and so tightens the spring $r^4$ or stores up power in said spring, as in the winding of a watch.

On the other end of shaft K is a disk, $u$, having lugs or stops $u'$ $u^2$, corresponding in number with the number of sets of fingers $o$ on said shaft. A dog, $v$, pivoted to the frame at $v'$, has a shoulder, $v^2$, to engage with the upper lug, and a spring tail-piece, $v^3$, to engage with the lower lug, if more than one is employed, to hold the shaft K from turning accidentally. This dog has a nose, $v^4$, which engages with a cam, $w$, on the tripping-shaft L. This cam $w$ has a spring-face, $w'$, upon which the nose $v^4$ rests, and which lifts the dog from the lug of disk $u$, to permit the rotation of shaft K, and which yields to permit the nose to pass, so as to allow its shoulder $v^2$ to again engage one of the lugs on the disk $u$. As the bundler is being filled with grain the ratchet is being revolved and the spring $r^4$ tightened until cam $r^6$ of the ratchet comes in contact with the spring-hook $t^3$, whereby said hook is moved out of contact with the pin $t'$, and the spring $t^2$ is free to act to elevate the slide $t$, and so raise the pawl from the ratchet, as in the position shown in Fig. 1, at which time the spring $r^4$ has accumulated sufficient power, so that when free to act it may revolve the shaft K and drop or throw out the bundle of grain. The grain in the bundler will not be discharged until it has accumulated sufficiently to raise the fingers $p$ to such a height as to cause the spring-face $w'$ of the cam $w$ to raise the shoulder $v^2$ of the dog $v$ free of the lug on the disk $u$, at which occurrence the spring $r^4$ is free to act to cause the strap $r^2$ to wind about the drum $r^3$, revolving the shaft K, so as to cause its fingers $o$, which sustain the bundle of grain, to quickly rise, carrying the bundle against and within the inner edges of the bars M, and discharging it at the point Z, Fig. 4, nearly at one extreme side of the machine. The dog will then fall against the formerly opposite lug on disk $u$, and the winding up of the strap and spring go on, which is made possible by the pin $r^5$ of the ratchet striking the pin $t'$ on the slide $t$, and carrying such slide down until the hook $t^3$ shall pass over and engage the said pin $t'$, so as to allow the pawl to be in operative connection with the ratchet again.

The bar L is made to operate at any desired time to form bundles of different sizes by setting the cam $w$ upon the said bar at the proper elevation by means of the set-screw $w^2$.

By my form of rake the grain, no matter how it falls upon the platform, is carried to the bundler straight.

The reel A' is journaled in a box, B', on an adjusting-arm, C', which is arranged upon an operating-shaft, D'. When the pulleys of reels are arranged outside their boxes the reel-spindle binds in the box. To remedy this the pulley 1 is placed between the box and reel-arms and connected by a belt or chain with the driving-pulley 2 on shaft D'.

To obtain the proper elevation of the cutter-bar there may be attached to the tongue or pole F' a notched arc, G', to engage with a staple or plate, H', upon the frame, the tongue being adjusted through its arc G' by means of a spring latch-lever, J'.

What I claim is—

1. The combination of a series of reciprocating tilting rake-heads and a connecting shouldered locking-bar, $g$, substantially as and for the purpose specified.

2. The combination, with the reciprocating tilting rake-heads, of a shouldered locking-bar, $g$, and a spring, $h$, attached to one rake-head and bearing upon the next adjacent one, substantially as and for the purpose specified.

3. The combination of a disk having one or more cam-faces and a reciprocating tilting rake, substantially as and for the purpose specified.

4. A cam-disk, a detent therefor, and a reciprocating tilting rake combined, substantially as described.

5. In a grain-bundling mechanism, the arched bars M, having fingers M', in combination with inlet-guards composed of pivoted spring-arms $m$, having the curved ends $m'$, forming part of said bundling mechanism, and adapted to yield to permit the introduction of the grain thereinto, and operating automatically to prevent its recession, substantially as specified.

6. In a grain-bundler, the combination, with the reciprocating tilting rake or grain-carrier, of a reversely-reciprocating follower mechanism, composed of the gravitating follower-blocks W, shaft N, slides O, and operating devices adapted to advance and take the grain from the rake or carrier as said rake or carrier is depressed or tilted upon its return motion, substantially as described.

7. The combination, with a grain holding and discharging device, of a pawl and ratchet, a power-spring, a spring-slide, and a pin thereon, a detent therefor, and a pin and cam on said ratchet, to operate substantially as described.

8. In a grain-bundler, the combination, with a dog for holding the bundler, of a cam for raising said dog to release the bundler and a yielding face on said cam to permit the dog to re-engage and hold the bundler, substantially as described.

9. The combination, with the intermittingly-rotating bundle holding and discharging device, of a disk with lugs thereon and a dog having a shoulder and a spring tail-piece to engage the lugs on said disk, and a device for operating said dog, substantially as and for the purpose described.

10. The combination of grain-bundling mechanism, a device to hold the same while being filled, a device to release it when filled, and a cam adapted to be adjusted to vary the size of the bundle or gavel, substantially as specified.

11. The combination of grain-bundling mechanism, holding and releasing devices therefor, and an adjustable cam operating in connection with said releasing device, in accordance with its adjustment relative thereto, to discharge bundles or gavels of different sizes, substantially as specified.

To the above specification of my invention I have signed my name this 18th day of December, A. D. 1879.

PHILEMON BARBER.

Witnesses:
WM. H. FINCKEL,
HARRY FINCKEL.